United States Patent [19]
Cochrane et al.

[11] Patent Number: 6,029,584
[45] Date of Patent: Feb. 29, 2000

[54] FURNITURE ASSEMBLY

[75] Inventors: Steven Cochrane, Portage; Roman Rabiej, Mattawan, both of Mich.; Dmitry Azrikan, Chicago, Ill.

[73] Assignee: The Board of Trustees of Western Michigan University, Kalamazoo, Mich.

[21] Appl. No.: 09/030,105

[22] Filed: Feb. 25, 1998

[51] Int. Cl.[7] .................................................. A47B 57/00
[52] U.S. Cl. ..................... 108/101; 108/153.1; 108/150
[58] Field of Search .................... 108/153.1, 92, 108/101, 93, 150, 190, 191

[56] References Cited

U.S. PATENT DOCUMENTS

| | | | |
|---|---|---|---|
| D. 306,101 | 2/1990 | Borsani | 108/93 X |
| 900,331 | 10/1908 | Weston | 108/101 |
| 1,208,628 | 12/1916 | Nutrizio | 108/150 X |
| 2,177,387 | 10/1939 | Greitzer | 108/150 X |
| 2,433,748 | 12/1947 | Eide | 108/101 |
| 3,137,522 | 6/1964 | Smith | 108/101 |
| 3,263,355 | 8/1966 | March | 108/101 |
| 4,188,891 | 2/1980 | Boyajian | 108/92 X |
| 4,674,415 | 6/1987 | Smith | 108/150 |
| 5,692,624 | 12/1997 | McKinney | 108/153.1 X |
| 5,772,055 | 6/1998 | Orr et al. | 108/153.1 X |

FOREIGN PATENT DOCUMENTS 72 of 1896 United Kingdom ..................... 108/92

*Primary Examiner*—Peter M. Cuomo
*Assistant Examiner*—Hanh V. Tran
*Attorney, Agent, or Firm*—Flynn, Thiel, Boutell & Tanis, P.C.

[57] ABSTRACT

A furniture assembly is made up of a base member, an intermediate member, an upper member and several flexible connectors which join the base, intermediate and upper member. The base can have a central opening provided therein having a continuous inner surface and the intermediate member can have a continuous outer surface which corresponds to the continuous inner surface of the base. The flexible connectors pass through openings provided in the intermediate member and fixes the relative positions of the base member, upper member and intermediate member by resilient forces.

12 Claims, 7 Drawing Sheets

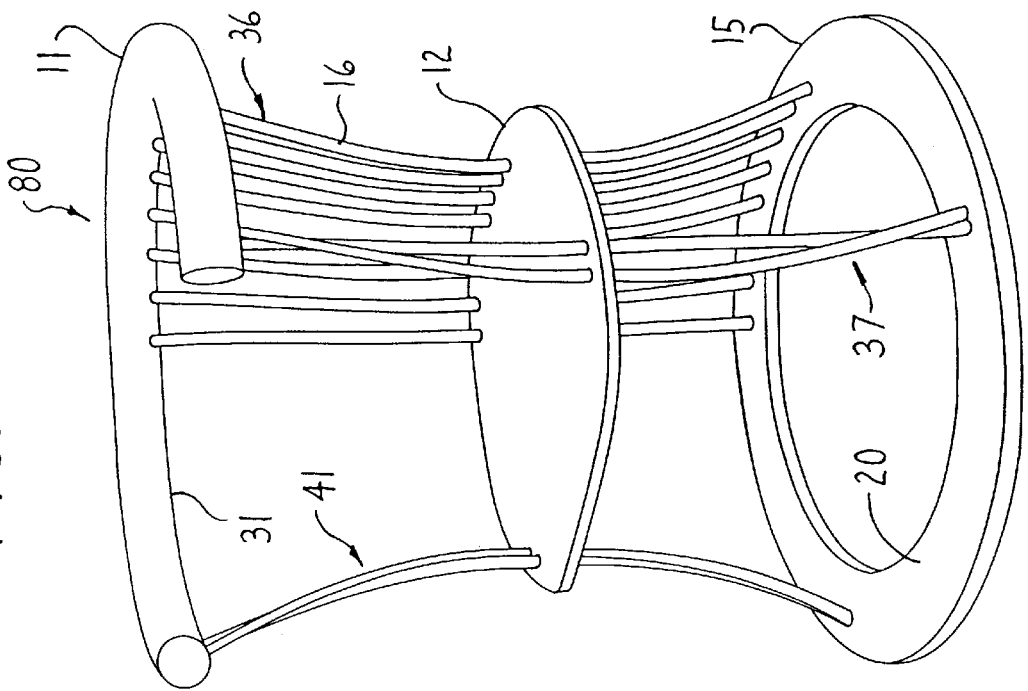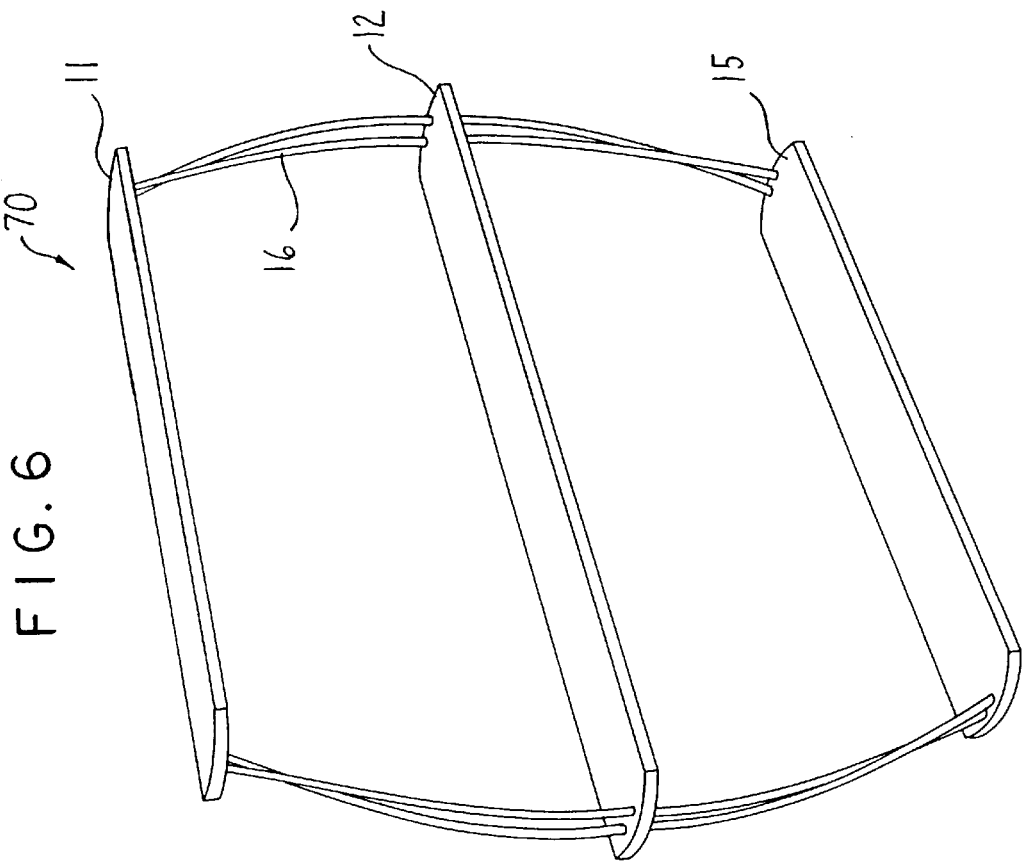

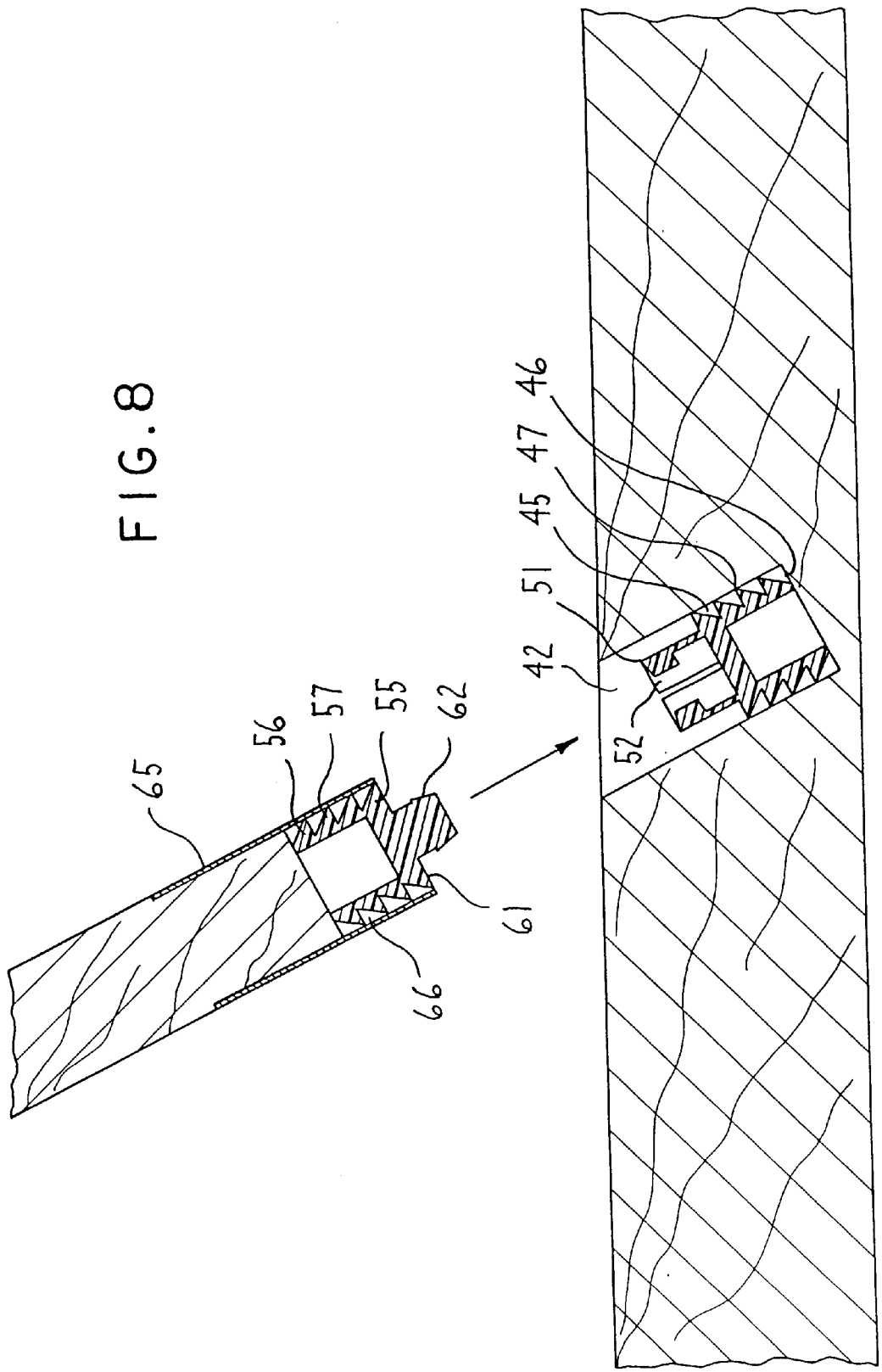

FURNITURE ASSEMBLY

FIELD OF THE INVENTION

This invention relates to a furniture assembly and, more specifically, to a furniture assembly of multi-level construction in which resilient forces secure the multi-level construction.

BACKGROUND OF THE INVENTION

Typical furniture assemblies such as tables having multiple support surfaces are well known in the art as shown in U.S. Pat. Nos. 3,106,901 and 5,125,348. These multi-level tables typically are made up of upper and lower support surfaces which are fixed in position by rigid metal posts which also may serve as support legs for the tables. These conventional table assemblies require complex supporting and spacing substructure which makes the assembly of these tables unduly complicated and expensive. Therefore, there is a need for a multi-level furniture assembly which does not have a complex support and spacing substructure and which can be inexpensively fabricated.

It is an object of the present invention to provide a multi-level furniture assembly which is of simple construction and which can be inexpensively fabricated.

SUMMARY OF THE INVENTION

This and other objects of the present invention are accomplished by providing a furniture assembly comprising a base member, an intermediate member, an upper member and a plurality of flexible connection members joining the base member, intermediate member and the upper member. The connection members pass through a plurality of apertures provided in the intermediate member and extend to the base member and the upper member. The connection members are elastically deformed and fix the positions of the base member, intermediate member and upper member with respect to each other by resilient forces resulting from the deformation of the connection members.

BRIEF DESCRIPTION OF THE DRAWINGS

FIG. 6 is a perspective view of a second type of shelf assembly according to the present invention.

FIG. 7 is a perspective view of a chair assembly according to the present invention.

FIG. 8 is a sectional view illustrating a manner of securing the ends of the flexible connection members.

DETAILED DESCRIPTION

Figure 1:
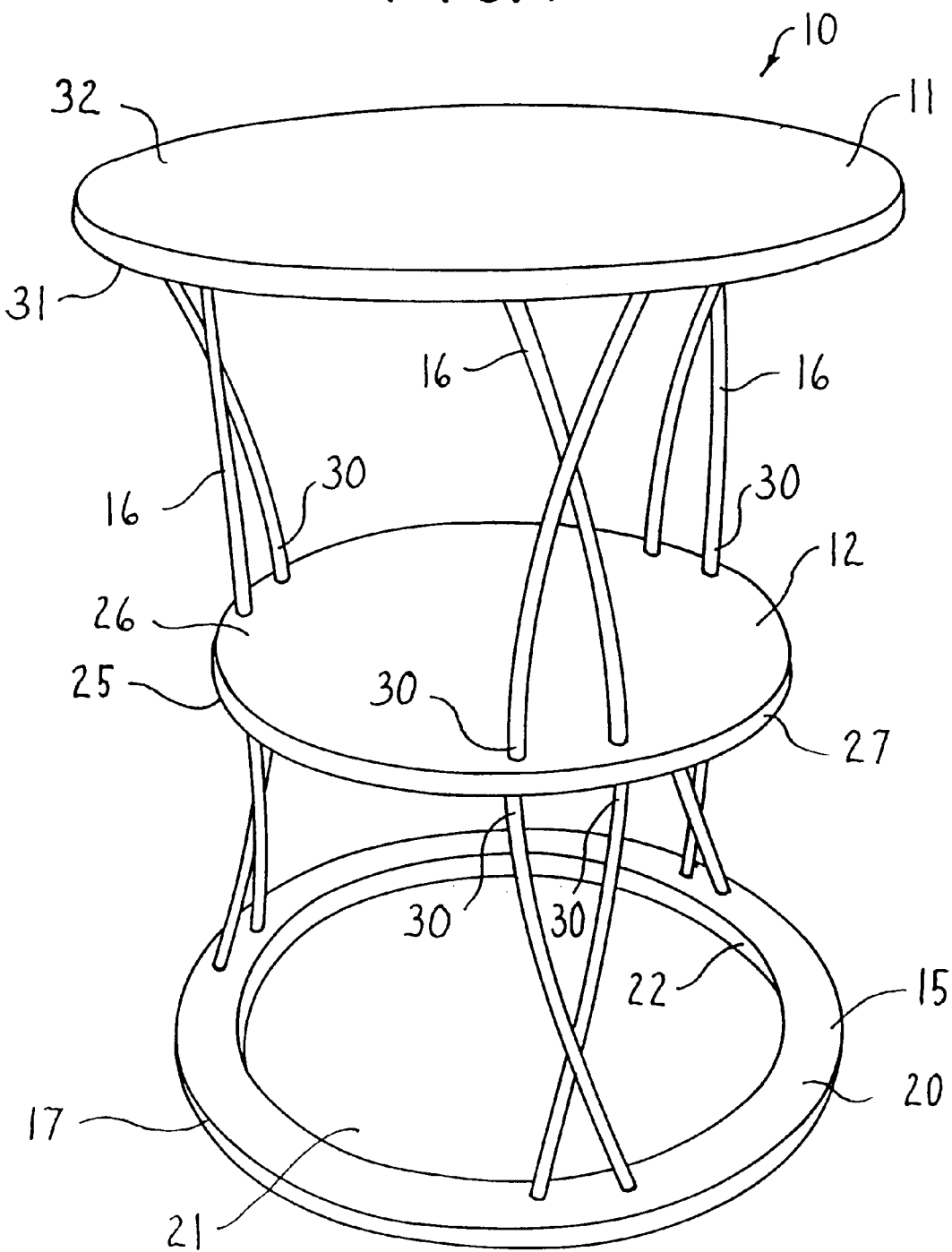
FIG. 1 is a perspective view of a table assembly according to a first embodiment of the present invention.
Figure 2:
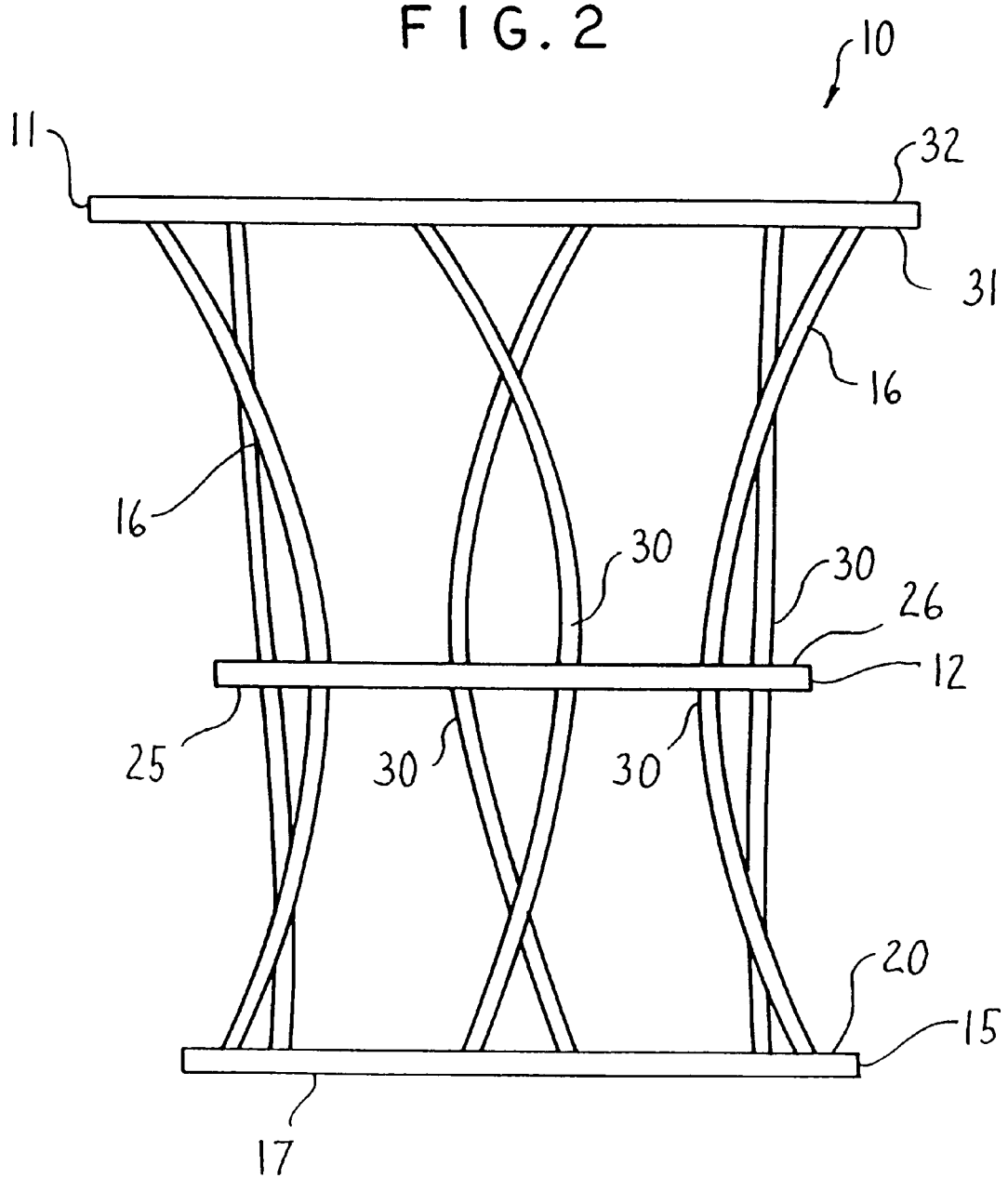
FIG. 2 is a side view of the table assembly of FIG. 1.

FIGS. 1 and 2 illustrate a first embodiment of a table assembly 10 of the present invention. This table assembly is made up of an upper member 11, an intermediate member 12, a base member 15 and a plurality of flexible connection members 16. The base member 15 can have a planar lower surface 17 upon which the table assembly 10 can be supported, a planar upper surface 20 and a central opening 21 provided therein which defines a continuous inner surface 22 of the base member 15. Means for affixing the lower ends of the connection members 16, such as holes provided in the base member upper surface 20, is illustrated in FIG. 8.

The intermediate member 12 also can have a planar lower surface 25, an upper surface 26 and a continuous outer surface 27 which can substantially correspond to the continuous inner surface 22 of the base member 15. In fact, the intermediate support member 12 can be formed by cutting it out of the base member 15. A plurality of holes (not shown) extend through the intermediate support member 12 so that intermediate portions 30 of the connection members 16 can extend therethrough.

The upper member 11 also can have a planar lower surface 31 and upper surface 32. Similar to the upper surface 20 of the base member 15, the lower surface 31 of the upper support member 11 can have means for affixing the upper ends of the connection members 16 to the upper support member 11 in holes (not shown) which receive the upper ends of the connection members 16.

As shown in the figures, the connection members 16 are elongated poles which have an intermediate portion 30 which extends through the intermediate support member 12 through holes provided therein and have upper ends affixed to the lower surface 31 of the upper support member 11 and lower ends affixed to the upper surface 20 of the base member 15. The connection members 16 can be flexible such that the paths of adjacent connection members 16 crisscross between the upper support member 11 and the intermediate support member 12, and the intermediate support member 12 and the base member 15.

The connection members 16 are elastically deformed and fix the relative positions of the base member 15, intermediate member 12 and upper member 11 through resilient forces resulting from the deformation of the connection members 16.

The upper surfaces of the upper support member 11 and intermediate support member 12 are contained in a horizontal plane so that articles can be supported thereon. The table assembly 10 of the present invention can be made out of wood, metal or a synthetic material as desired. The material of the construction for the individual components making up the table assembly 10 of the present invention can be the same or different as desired.

Figure 3:
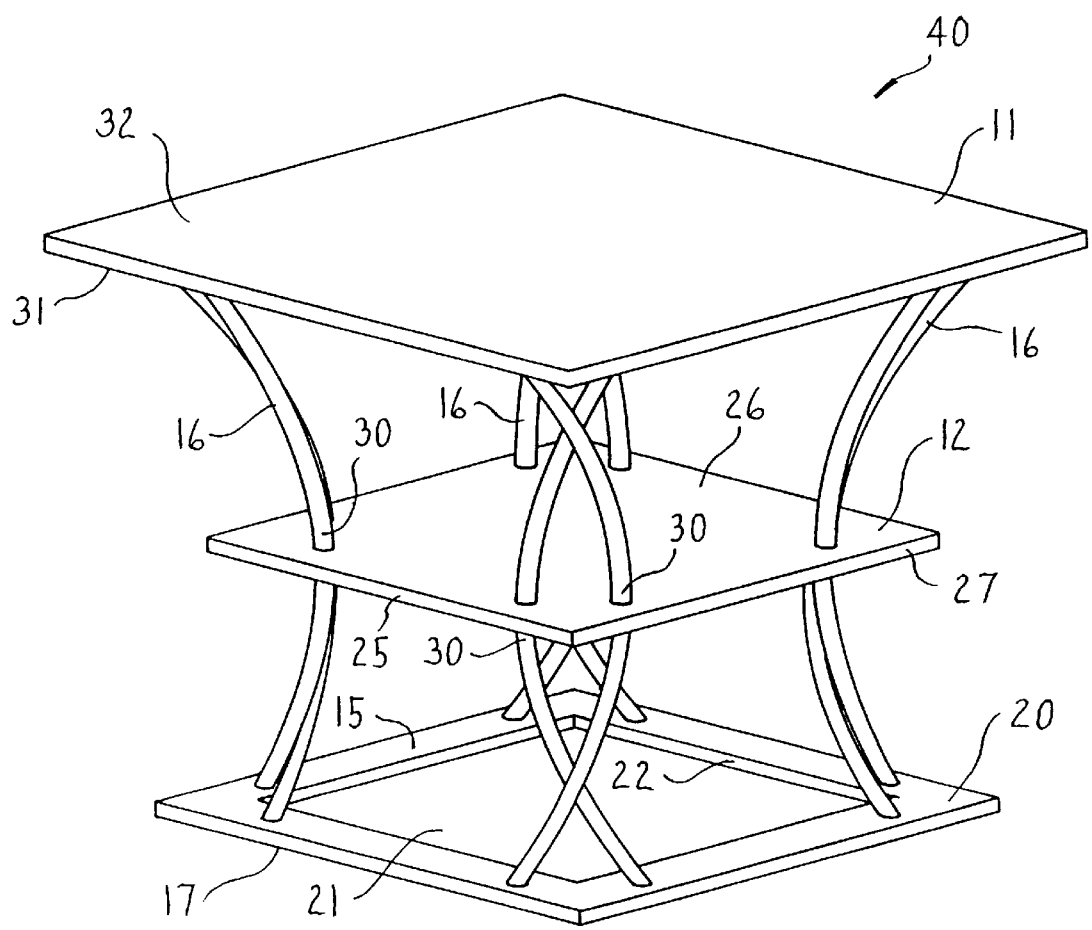
FIG. 3 is a perspective view of another table assembly according to the first embodiment of the present invention.

FIG. 3 illustrates a second type of table assembly 40 according to the present invention wherein the upper support member 11, intermediate support member 12 and base member 15 have a square configuration. The numerals used to describe FIG. 3 are the same as in FIGS. 1 and 2 with respect to the description of similar elements.

Figure 4:
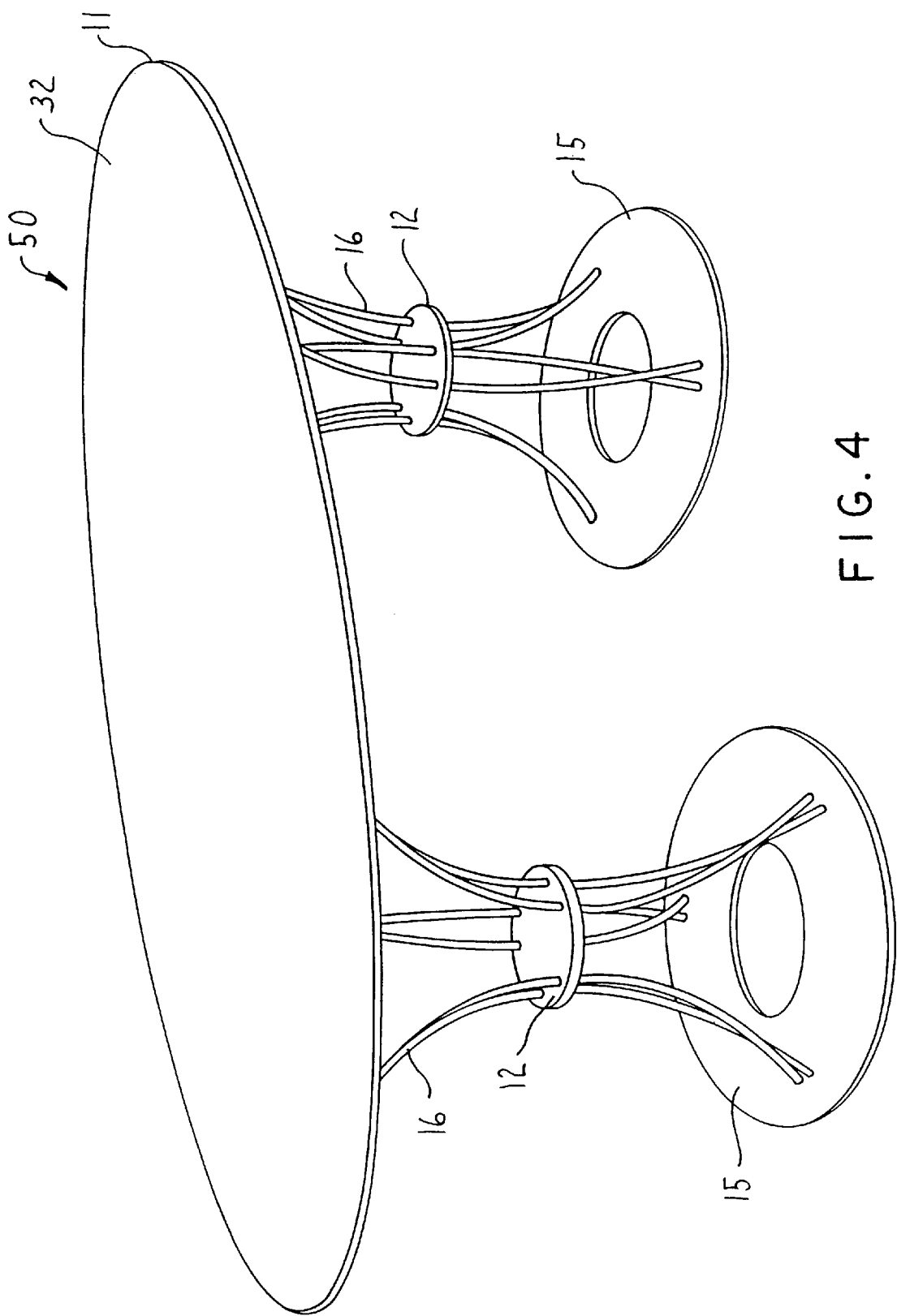
FIG. 4 is a perspective view of a table assembly according to a second embodiment of the present invention.

FIG. 4 illustrates a table assembly 50 according to a second embodiment of the present invention. In the table assembly of this embodiment, a common upper member 11 is provided over two sets of base members 15, connection members 16 and intermediate members 12. The upper member 11 is provided in elliptical form in order to increase the surface area of its upper surface 32 and the two sets of base members 15, connection members 16 and intermediate members 12 are located under the upper member 11 at positions which provide maximum stability to the table assembly 50.

Figure 5:
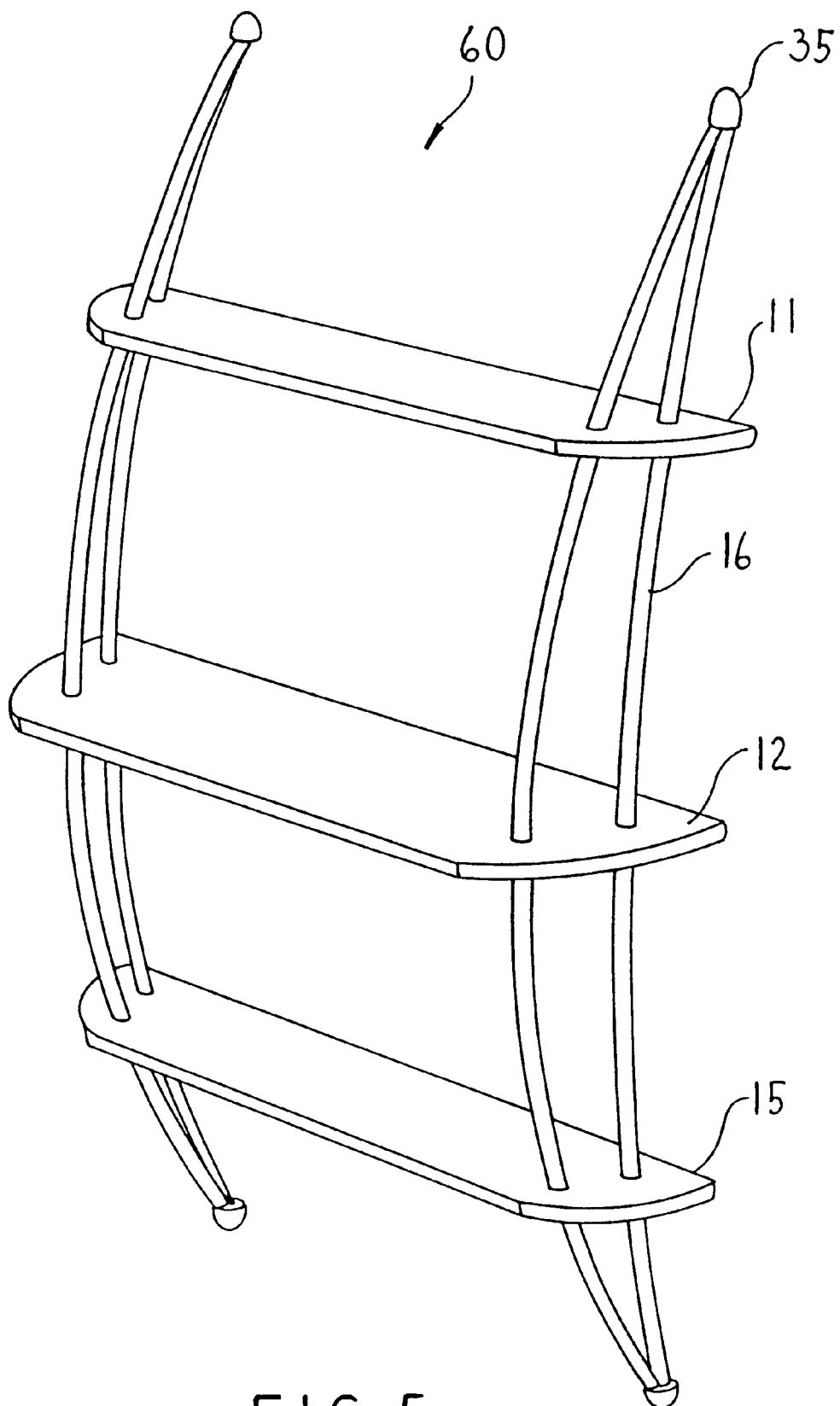
FIG. 5 is a perspective view of a first type of shelf assembly according to the present invention.

FIG. 5 illustrates a shelf assembly 60 according to the present invention. The shelf assembly 60 comprises an upper member 11, an intermediate member 12, a base member 15 and flexible connection members 16 extending through openings (not shown) provided in the upper, intermediate and base members. As shown in FIG. 5, the flexible connection members 16 are elastically deformed such that the ends of adjacent connection members 16 can be contained in a cap 35. The resilient forces resulting from the deformation of the connection members 16 fix the relative positions of the upper, intermediate and base members 11, 12, 15 with respect to each and the caps 35 can be provided between parallel surfaces (not shown) in order to secure the shelf assembly 60 in an upright fashion.

FIG. 6 illustrates a shelf assembly 70 according to a second embodiment of the present invention. This shelf assembly 70 also comprises an upper member 11, an intermediate member 12, a base member 15 and flexible connection members 16. In this embodiment of the present invention, the base member 15 supports the shelf assembly 70 on its flat lower surface 17 and adjacent flexible connection members 16 crisscross each other between the upper member 11 and the intermediate member 12 and the intermediate member 12 and the base member 15 and the upper ends of the connection members 16 are contained in the lower surface 31 of the upper member 11 and the lower ends of the connection members 16 are contained in the upper surface 20 of the base member 15.

FIG. 7 illustrates a chair assembly 80 according to the present invention. The chair assembly 80 comprises a rounded, arc-shaped upper member 11, an intermediate member 12, a base member 15 and a plurality of connection members 16 which pass through the intermediate member 12 and are secured in the lower surface 31 of the upper member 11 and the upper surface 20 of the base member 15. A first grouping 36 of connection members 16 are joined to the rounded, arc-shaped upper member 11 at a bight portion thereof and serve as a back portion of the chair assembly 80 between the upper member 11 and the intermediate member 12. Second and third groupings 37, 41 of connection members 16 are joined to the arc-shaped upper member 11 adjacent to the ends thereof and serve as an arm support means between the upper member 11 and the intermediate member 12. The connection members 16 serve as legs between the intermediate member 12 and the base member 15. The connection members 16 in the first grouping 36 preferably do not criss-cross with one another when serving as a back portion to maximize the comfort of a sitter.

FIG. 8 illustrates a method of securing the end of a connection member 16 in the upper or lower surface 20, 31 of the base member 15 or upper member 11. A slanted opening 42 is formed in the upper surface 20 of the base member 15 or the lower surface 31 of the upper member 11 by drilling or any other suitable method. A first fastener 45 having a first end 46 with a plurality of engagement fingers 47 having a diameter equal to the diameter of the slanted opening 42 is inserted into the opening 42 to secure the first fastener 45 in the opening 42. The first fastener 45 has a second end 51 formed into a female member 52 adapted to interlockingly receive a male member 62 of a second fastener 55.

A sleeve 65 is formed around the end of the connection member 16 and defines a space 66 which is adapted to receive a first end 56 of a second fastener 55. The first end 56 of the second fastener 55 has a plurality of engagement fingers 57 formed thereon having a diameter equal to the diameter of the space 66 and the first end 56 is inserted into the space 66 so that the second fastener 55 is secured therein and a second end 61 of the second fastener 55 extends beyond the sleeve 65. The second end 61 is formed with a male member 62 which is adapted to be received in and interlockingly engage with the female member 52 of the first fastener 45. The fasteners 45, 55 and the sleeve 65 can be made of any suitable material, with plastics or metals being preferred.

Although particular embodiments of the present invention have been described for illustrative purposes only, it would be well within the skill of the art to vary particular aspects of the present invention and still not depart from the scope and spirit thereof.

We claim:

1. A furniture assembly comprising a base member, an intermediate member, an upper member and a plurality of resilient connection members passing through said intermediate member and extending from said base member to said upper member, said resilient connection members being elastically deformed and fixing said base member, intermediate member and upper member in relative, spaced-apart relationship with respect to one another by resilient forces resulting from the deformation of said connection members, wherein adjacent connection members criss-cross each other between the base member and the intermediate member and between the intermediate member and the upper member.

2. The furniture assembly of claim 1, wherein each of said resilient connection members have an upper end and a lower end, the lower ends of said resilient connection members being contained in openings formed in an upper surface of said base member and the upper ends of said resilient connection members being contained in openings formed in a lower surface of said upper member.

3. The furniture assembly of claim 2, wherein each of said resilient connection members pass through an opening formed in said intermediate member.

4. The furniture assembly of claim 1, wherein the base member has a flat lower surface and the upper member has a flat upper surface.

5. The furniture assembly of claim 1, wherein the base member has a central opening provided therein which defines a continuous inner surface and the intermediate member has a continuous outer surface corresponding to the continuous inner surface of the base member.

6. The furniture assembly of claim 1, wherein the base member, intermediate member and upper member have circular configurations.

7. The furniture assembly of claim 1, wherein the base member, intermediate member, upper member and connection members are made of wood.

8. The furniture assembly of claim 1, wherein the base member, intermediate member, upper member and connection members are made of a metal.

9. The furniture assembly of claim 1, wherein the base member, intermediate member, upper member and connection members are made of a synthetic material.

10. The furniture assembly of claim 1, wherein the connection members are elongated poles.

11. The furniture assembly of claim 1, wherein the base members, intermediate member and upper member have rectangular configurations.

12. The furniture assembly of claim 1, wherein said upper member is arc-shaped.

* * * * *

UNITED STATES PATENT AND TRADEMARK OFFICE
CERTIFICATE OF CORRECTION

PATENT NO : 6 029 584
DATED : February 29, 2000
INVENTORS : Steven Cochrane et al

It is certified that error appears in the above-identified patent and that said Letters Patent are hereby corrected as shown below:

Column 4, line 60;  change "base members" to ---base member---.

Signed and Sealed this

Tenth Day of April, 2001

*Attest:*

NICHOLAS P. GODICI

*Attesting Officer*          *Acting Director of the United States Patent and Trademark Office*